United States Patent Office.

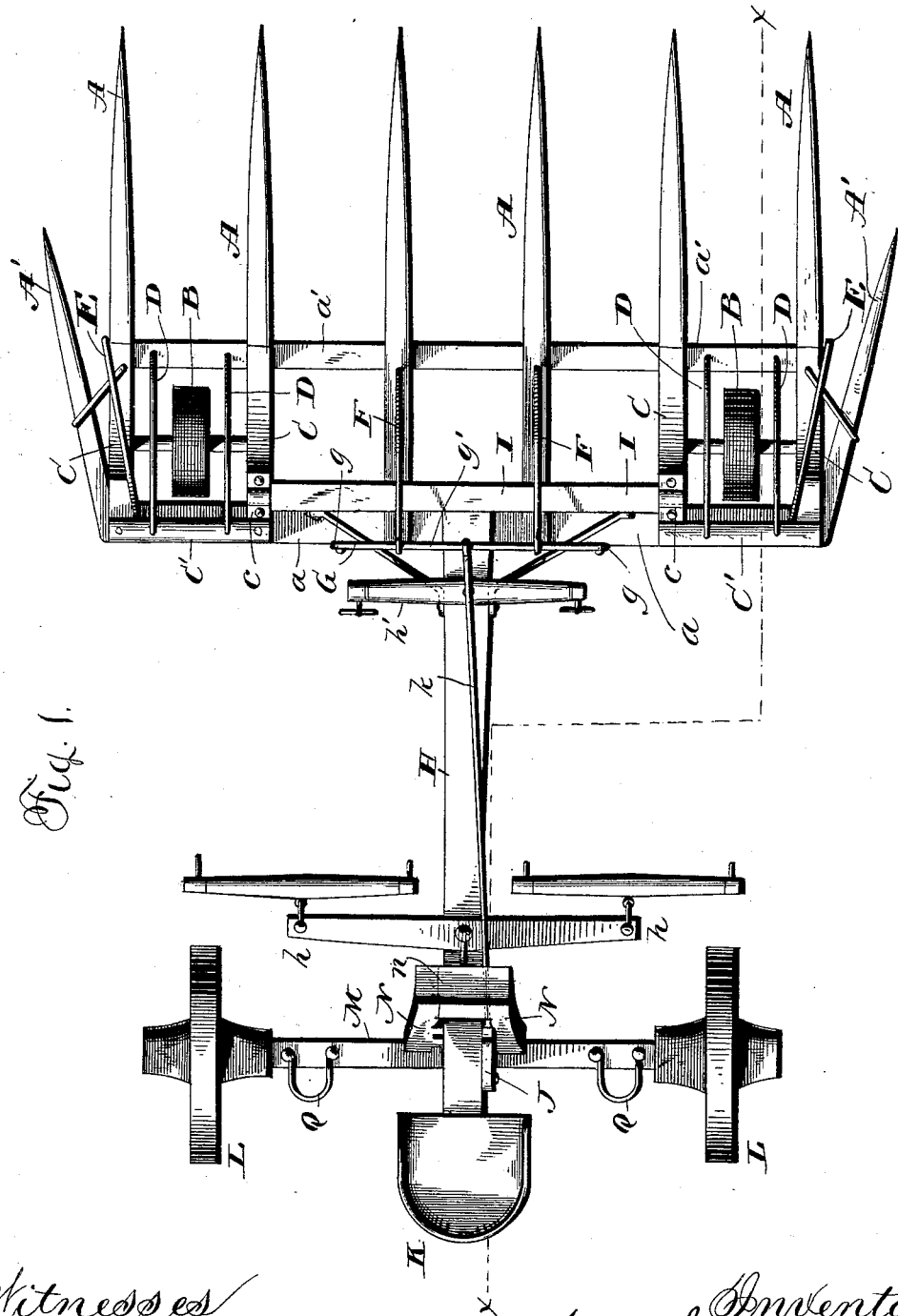

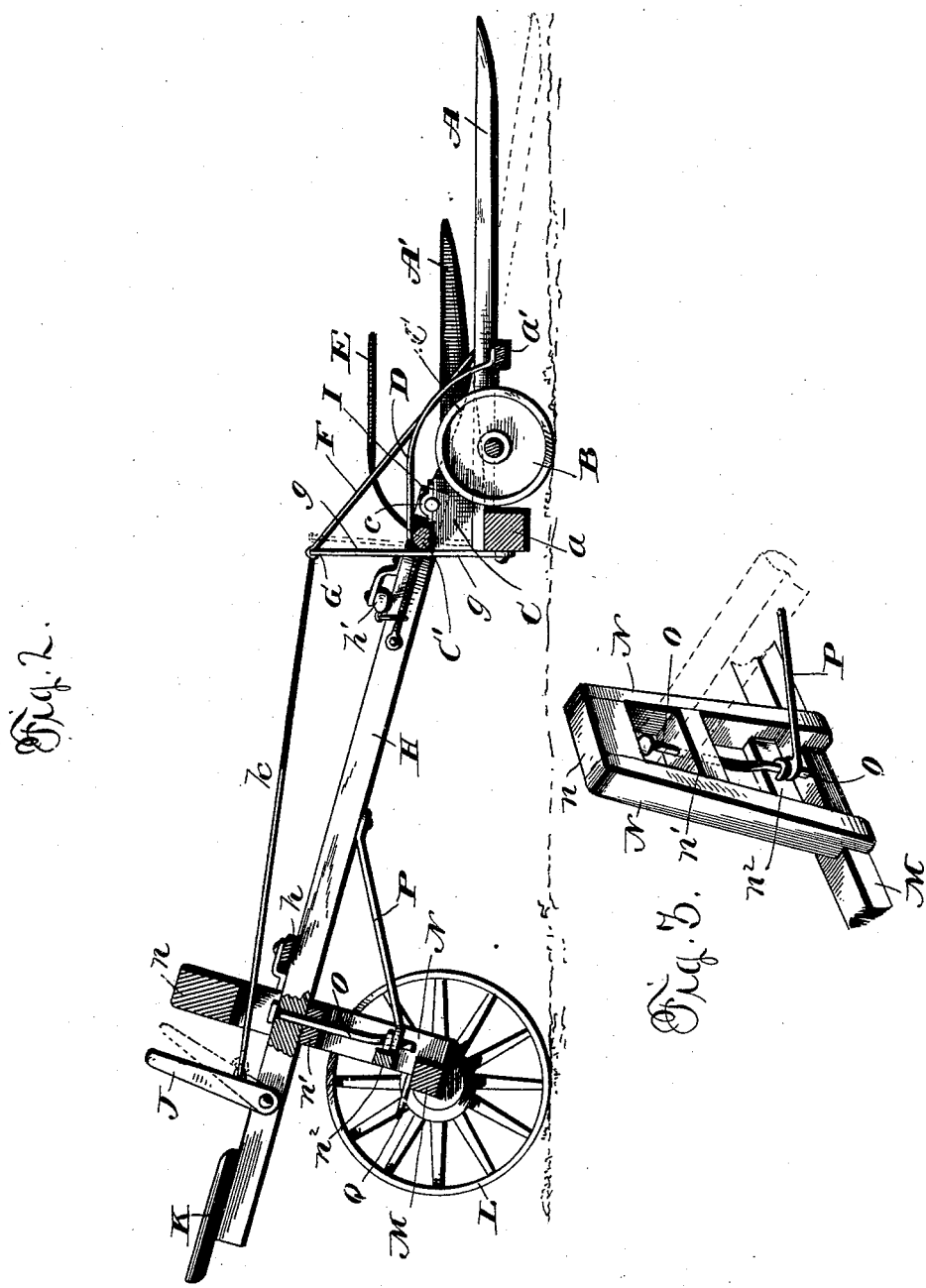

HENRY S. POWELL, OF YATES CENTRE, KANSAS, ASSIGNOR OF ONE-HALF TO S. J. MINAKER, OF SAME PLACE.

HORSE HAY-RAKE.

SPECIFICATION forming part of Letters Patent No. 475,342, dated May 24, 1892.

Application filed February 23, 1892. Serial No. 422,497. (No model.)

*To all whom it may concern:*

Be it known that I, HENRY S. POWELL, a citizen of the United States, residing at Yates Centre, in the county of Woodson and State of Kansas, have invented certain new and useful Improvements in Horse Hay-Rakes; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to certain new and useful improvements in horse hay-rakes of the "header" class, and it aims to provide a machine superior in certain respects to those heretofore constructed.

With this end in view said invention consists in the rake having the construction and arrangement of parts hereinafter described, shown in the accompanying drawings, and then particularly defined in the appended claim.

The invention is clearly illustrated in the accompanying drawings, which with the letters of reference marked thereon form a part of this specification, like letters of reference indicating the same parts throughout the several views, in which—

Figure 1 is a plan view of a rake constructed in accordance with my invention. Fig. 2 is a longitudinal section, and Fig. 3 is a detail perspective view of a portion of the axle and the swiveling and pole-supporting device.

The rake consists of a number of tines or teeth A, fastened at their rear ends to the transverse bar or beam $a$, from which they extend forward in parallel lines, as usual, a second transverse beam $a'$ being secured to their under sides a short distance in advance of the other. Between the two outer teeth on each side and in the space between the beams $a$ and $a'$ is mounted a supporting-wheel B, whose axle is secured to the rake-teeth. Extending forward and outward from each extremity of the rake-beam $a'$ obliquely to the teeth A is a tooth or tine A', shorter than the latter and arranged in a higher plane, to assist in the support of the hay when on the rake. Upon the upper side of each of the two outer teeth, between which the wheels B are located, is a block C, whose front face inclines downward, but whose rear face is abrupt. A bar C' connects the block on one tooth with the block of the adjacent tooth, and arched over each wheel from the front bar $a'$ to the bar C' are two curved rods D, which constitute guards to prevent hay from falling upon and becoming entangled in the wheels. Curving upward and forward from the rear beam $a$, adjacent to the outer rake-tooth, is a rod E, which acts to prevent the hay from being carried over the back of the rake, while to perform the same office at the central part are two upwardly and rearwardly inclined rods F F, whose lower ends are secured to the two central teeth A and whose upper and rear ends are attached to a bar G, which is secured to and rises from the rear beam $a$. Said bar has two vertical portions $g$, connected by a horizontal part $g'$, the rods F being secured to the latter. The guards or fenders, it will be seen, are all made of light rods, so that they add but little weight to the machine.

A pole H, provided with doubletrees $h$ $h$ and neck-yoke $h'$ for attaching horses to the rake, is connected at its front end to the rake and supported near its rear end upon a pair of wheels. For securing it to the rake a transverse bar or beam I is attached to its end, whose opposite ends are journaled in boxes $c$ upon the two inner blocks C', which are mounted on the teeth A next to the two outside ones. By this arrangement the thrust of the pole is applied to the rake near each side, enabling the same to be pushed forward very steadily without undue vibration and racking of the parts. The connection between the bar or beam I and the rake-head is a pivotal one, in order that the rake may be raised and lowered, as is usual in machines of this character by mechanism to be described. Said raising and lowering is effected by rocking the rake on its pivotal connections with the bar by means of a lever J, pivoted on the side of the pole H in convenient reach from the seat K on its rear end, which lever is connected by a rod $k$ with the horizontal portion $g'$ of the guard-bar G, the latter thus serving two purposes. The pole H is supported at its rear end upon two wheels L L, mounted upon an axle M. From the center of the latter and attached thereto rise two uprights N, connected at their upper ends by a transverse bar or block $n$, while just below the latter is a second bar $n'$. Between these bars passes the pole H, being supported by the lower one $n'$, on which it rests. The connection between the pole and its support is a swiveled or pivoted one to enable the axle and wheels to be turned to guide the rake, said connection consisting of a rod or bar O, which passes through an opening in the pole, one in the bar $n'$ and the other through an eye provided on a transverse bar $n^2$ between the bar $n'$ and the axle. Sufficient space is left between the uprights to allow all requisite movement of the axle before they are struck by the sides of the pole, and the latter by engagement with them serves to limit the movement of the axle and prevent any possibility of the accidental throwing of the wheels against the horses' hind legs.

To brace the pole a bar or rod P is secured to its under side and is carried rearward and downward and attached by an eye or loop to the pivot bar or rod O immediately below the eye on the bar $n^2$, said bar O being extended below the latter for this purpose.

To move the wheels for the purpose of guiding the rake, a loop or stirrup Q is projected rearward from the axle—one upon each side of its center—with which the heel of the operator's foot may engage when the foot is placed upon the axle. The axle can thus be turned by throwing one or the other side forward by the use of either the right or the left foot, as required.

Having thus described my invention, what I claim to be new, and desire to secure by Letters Patent, is—

In combination, the rake consisting of the teeth and the two transverse bars at the rear end thereof, the blocks upon the two outer teeth upon each side, the supporting-wheels between said teeth, the bar C', connecting the blocks C, adjacent to each other, the curved guard-rods D, extending to the latter from the front of the two transverse bars, the fender at the center of the rake consisting of the upwardly and rearwardly inclined rods connected to the bar G, the pole, the transverse bar at the front end of the pole having its opposite ends pivoted to the inner two of the blocks C, the rake-rocking lever pivoted to the pole and connected to the fender-bar G, and the support for the rear end of the pole consisting of the wheels, the axle, the two uprights connected to and rising upward from the latter, the transverse bars connecting said uprights, on one of which the pole rests, the pivot-rod passing through the latter and its supporting-bar and through an eye in a transverse bar below, and the brace-rod extending rearwardly and downwardly from the under side of the pole and attached by an eye to the pivot-rod, substantially as described.

In testimony whereof I affix my signature in presence of two witnesses.

HENRY X S. POWELL.
his mark

Witnesses:
R. M. PHILLIP,
J. G. POWELL.